United States Patent
Wu et al.

(10) Patent No.: US 11,673,991 B2
(45) Date of Patent: Jun. 13, 2023

(54) HIGH STRESS THERMAL PLASTIC POLYURETHANE, ITS PREPARING FORMULATION AND MAKING PROCESS

(71) Applicant: CHANDA CHEMICAL CORP., Taipei (TW)

(72) Inventors: Chien-Hsin Wu, Taipei (TW); Ying-Chi Huang, Taipei (TW); Sheng-hong A. Dai, Taipei (TW); Ru-Jong Jeng, Taipei (TW)

(73) Assignee: CHANDA CHEMICAL CORP., Taipei (TW)

( * ) Notice: Subject to any disclaimer, the term of this patent is extended or adjusted under 35 U.S.C. 154(b) by 0 days.

(21) Appl. No.: 17/852,661

(22) Filed: Jun. 29, 2022

(65) Prior Publication Data

US 2022/0325029 A1    Oct. 13, 2022

Related U.S. Application Data

(63) Continuation of application No. 16/735,041, filed on Jan. 6, 2020, now abandoned.

(30) Foreign Application Priority Data

Dec. 13, 2019    (TW) .................. 108145800

(51) Int. Cl.
*C08G 18/64* (2006.01)
*C08G 18/10* (2006.01)
*C08G 18/32* (2006.01)
*C08G 18/42* (2006.01)
*C08G 18/48* (2006.01)
*C08G 18/75* (2006.01)
*C08G 18/76* (2006.01)
*C08G 18/40* (2006.01)
*C08G 18/44* (2006.01)
*C08G 18/61* (2006.01)
*C08G 18/73* (2006.01)

(52) U.S. Cl.
CPC .......... *C08G 18/6469* (2013.01); *C08G 18/10* (2013.01); *C08G 18/3206* (2013.01); *C08G 18/4277* (2013.01); *C08G 18/4825* (2013.01); *C08G 18/4833* (2013.01); *C08G 18/4854* (2013.01); *C08G 18/755* (2013.01); *C08G 18/7671* (2013.01)

(58) Field of Classification Search
None
See application file for complete search history.

(56) References Cited

PUBLICATIONS

Huntsman, "Technical Bulletin, Jeffamine EDR-148 polyetheramine," pp. 1-2, copyright 2007. (Year: 2007).*

* cited by examiner

*Primary Examiner* — Randy P Gulakowski
*Assistant Examiner* — Ha S Nguyen
(74) *Attorney, Agent, or Firm* — WPAT, PC (57) ABSTRACT

A thermal plastic polyurethane with a stress more than 2.5 MPa, its preparing formulation and making process are disclosed. In particular, the thermal plastic polyurethane with a stress more than 2.5 MPa is prepared from a formulation comprises a polycarbonate derivative and a chain extender.

20 Claims, 8 Drawing Sheets

HIGH STRESS THERMAL PLASTIC POLYURETHANE, ITS PREPARING FORMULATION AND MAKING PROCESS

CROSS-REFERENCE TO RELATED APPLICATIONS

This application is a continuing application of and claims priority benefit of application Ser. No. 16/735,041, filed on Jan. 6, 2020. The entirety of the above-mentioned patent application is incorporated herein by reference and a part of this specification

TECHNICAL FIELD OF THE INVENTION

The present invention relates to a high stress thermal plastic polyurethane, its preparing formulation and making process. In particular, the high stress thermal plastic polyurethane is prepared from a polycarbonate derivative, and has a stress more than 2.5 MPa.

BACKGROUND OF THE INVENTION

Thermal plastic polymer is a plastic polymer material that becomes pliable or moldable at a certain elevated temperature and solidifies upon cooling. Moreover, they can be reshaped and are typically used to produce parts by various polymer processing techniques.

However, some machine properties will be lost for keeping the linear structure of thermal plastic urethane. Generally, chemical modifying or physical blending thermal plastic urethane has a soft and brittle structure. As a result, their stress is less than 1.5 MPa. This advantage limits its application in many material industries.

Based on the aforementioned description, a thermal plastic polymer with high stress and its fabricating process are required for developing.

SUMMARY OF THE INVENTION

In one objective, the present invention provides a formulation for preparing thermal plastic polyurethane (TPU) with high stress. The formulation comprises a first part that comprises polyurethane oligomer and a second part that comprises a chain extender. The polyurethane oligomer is formed by reacting a polycarbonate derivative or a bisphenol compound with a diisocyanate, and the polycarbonate derivative has a structure as shown in formula (1).

(1)

In one example, $R_1$ group is derived from an aliphatic diamine, an aromatic diamine or a polyether diamine; and the diisocyanate is an aromatic diisocyanate or an aliphatic diisocyanate. The chain extender is selected from one of group consisting of an aliphatic diol, a polyether diol, a polyester diol and a bisphenol. A weight ratio of the chain extender and the polyurethane oligomer (weight of the chain extender/weight of the polyurethane oligomer) is 1-3, and m is an integer of 0-5.

In another example, $R_1$ group is derived from an amino compound containing siloxane or polysiloxane groups; and the diisocyanate is aliphatic diisocyanate. The chain extender is selected from one of group consisting of an aliphatic diol and a bisphenol. A weight ratio of the chain extender and the polyurethane oligomer (weight of the chain extender/weight of the polyurethane oligomer) is 0.2-0.8, and m is an integer of 0-5.

Generally, the polyurethane oligomer is formed by reacting the polycarbonate derivative or the bisphenol compound with the diisocyanate in the presence of an aprotic solvent or a mixed protic-aprotic solvent and a catalyst. The aprotic solvent comprises tetrahydrofuran, dimethyl sulfoxide, dimethylformamide, N-methyl-2-pyrrolidone or anisole, and the catalyst comprises stannous octoate or dibutyltin dilaurate.

In another objective, the present invention discloses a thermal plastic polyurethane. The thermal plastic polyurethane is high stress thermal plastic polyurethane and formed by reacting a polyurethane oligomer with a diol, wherein the polyurethane oligomer has a structure as shown in formula (2).

(2)

In one example, m is 0 (zero) and the polyurethane oligomer is formed by reacting a bisphenol compound with a diisocyanate, and x is an integer of 5-100. Preferably, the bisphenol compound is bisphenol A.

In another example, $R_1$ is derived from an aliphatic diamine, an aromatic diamine or a polyether diamine and $R_2$ is derived from an aromatic diisocyanate or an aliphatic diisocyanate; and the diol is selected from one of group consisting of an aliphatic diol, a polyether diol, a polyester diol and a bisphenol. A weight ratio of the diol and the polyurethane oligomer (weight of the diol/weight of the polyurethane oligomer) is 1-3, m is an integer of 0-5, and x is an integer of 5-100.

In still another example, $R_1$ is derived from an amino compound containing siloxane groups and $R_2$ is derived from aliphatic diisocyanate; and the diol is selected from one of group consisting of a aliphatic diol and a bisphenol. A weight ratio of the diol and the polyurethane oligomer (weight of the diol/weight of the polyurethane oligomer) is 0.2-0.8, m is an integer of 0-5, and x is an integer of 5-100.

Typically, the high stress thermal plastic polyurethane has a stress more than about 2.5 MPa. Preferably, the high stress thermal plastic polyurethane has a stress more than about 5.0 MPa.

In one example, the high stress thermal plastic polyurethane has a weight-average molecular weight of 10,000-400,000 Da.

In one example, the high stress thermal plastic polyurethane has peaks at about 1.35-1.65 ppm or 3.65-4.15 ppm in $^1$H-NMR spectrum. The thermal plastic polyurethane contains carbamate functional groups, and also has characterized peaks at about 7.5-8.0 ppm in $^1$H-NMR spectrum.

In still another objective, the invention provides a process for preparing thermal plastic polyurethane with high stress. The process comprises: (1) provide the aforementioned formulation; and (2) perform a chain extension reaction to have the aforementioned formulation form thermal plastic polyurethane with high stress, wherein the thermal plastic polyurethane with high stress has a stress more than about 2.5 MPa.

The process for preparing thermal plastic polyurethane with high stress is able to solve pollution problem because a waste polymer, such as waste polycarbonate, is use as the raw materials in the process. Moreover, carbon dioxide is not release from the process. Hence, the process effectively prolongs carbon dioxide in carbon cycle.

In one example, the chain extension reaction is performed between 60 and 100° C.

Accordingly, the present invention provides the formulation for preparing TPU with stress more than 2.5 MPa and the formulation comprises the PU oligomer synthesized from the polycarbonate derivative and diisocyanates. Moreover, the polycarbonate derivative is able to be prepared from waste polycarbonate. Furthermore, carbon dioxide is not release in the invented process for preparing TPU with stress more than 2.5 MPa. As a result, the process is an environmental-friendly process.

BRIEF DESCRIPTION OF THE PREFERRED EMBODIMENTS

In a first embodiment, the present invention discloses a formulation for preparing thermal plastic polyurethane (TPU) with high stress. The formulation comprises a first part that comprises polyurethane oligomer and a second part that comprises a chain extender. The polyurethane oligomer is formed by reacting a polycarbonate derivative or a bisphenol compound with a diisocyanate, and the polycarbonate derivative has a structure as shown in formula (1)

(1)

In one example of the first embodiment, $R_1$ group is derived from an aliphatic diamine, an aromatic diamine or a polyether diamine; and the diisocyanate is an aromatic diisocyanate or an aliphatic diisocyanate. The chain extender is selected from one of group consisting of an aliphatic diol, a polyether diol, a polyester diol and a bisphenol. A weight ratio of the chain extender and the polyurethane oligomer is 1-3, and m is an integer of 0-5.

In one example of the first embodiment, $R_1$ group is derived from an amino compound containing siloxane groups; and the diisocyanate is aliphatic diisocyanate. The chain extender is selected from one of group consisting of an aliphatic diol and a bisphenol. A weight ratio of the chain extender and the polyurethane oligomer is 0.2-0.8, and m is an integer of 0-5.

In one example of the first embodiment, the aliphatic diamine comprises a C2-C40 linear chain aliphatic diamine or a C2-C40 branched chain aliphatic diamine. Preferably, the C2-C40 linear chain aliphatic diamine is 1,4-butyl diamine, 1,5-pentyl diamine or 1,6-hexyl diamine.

In one example of the first embodiment, the aromatic diisocyanate comprises 4,4'-methylene diphenyl diisocyanate (MDI), 4,4'-difluoromethylene diphenyl diisocyanate, 1,4-phenylene diisocyanate, 1,3-phenylene diisocyanate, 1,2-phenylene diisocyanate, 2,2'-biphenyl diisocyanate, 3,3'-biphenyl diisocyanate, 4,4'-biphenyl diisocyanate, 1,5-naphthalene diisocyanate or their combination.

In one example of the first embodiment, the aliphatic diisocyanate comprises hexamethylene diisocyanate, isophorone diisocyanate (IPDI), 4,4'-dicyclohexylmethane diisocyanate or their combination.

In one example of the first embodiment, the aliphatic diol comprises a C2-C40 linear chain aliphatic diol or a C2-C40 branched chain aliphatic diol. Preferably, the C2-C40 linear chain aliphatic diol is 1,4-butyl diol, 1,5-pentyl diol or 1,6-hexyl diol.

In one example of the first embodiment, the polyether diol is selected from one of the group consisting of polytetramethylene ether glycol (PTMEG), polytetramethylene ether glycol-ethylene glycol copolymer, polytetramethylene ether glycol-propylene glycol copolymer and their combination.

In one example of the first embodiment, the polyester diol comprises polycarbonate diol, polycaprolactone diol or their combination.

In one example of the first embodiment, the polyether diamine has a weight-average molecular weight between 100 and 5,000 Da. Preferably, the polyether amine is Jeffamine type polyether diamine.

In one example of the first embodiment, the amino compound containing siloxane groups has a molecular weight between 150 and 10,000 Da.

The amino compound containing siloxane or polysiloxane groups has structure as shown in formula (3).

In one example of the first embodiment, the polyurethane oligomer has peaks at 1.35-1.65 ppm or 3.65-4.15 ppm in $^1$H-NMR spectrum.

In one example of the first embodiment, the polyurethane oligomer has a weight-average molecular weight between 4,000 and 40,000 Da.

In one example of the first embodiment, the formulation for preparing thermal plastic polyurethane with high stress is used for preparing thermal plastic polyurethane with stress more than about 2.5 MPa.

In a second embodiment, the invention discloses a thermal plastic polyurethane. The thermal plastic polyurethane is a high stress thermal plastic polyurethane and formed by reacting a polyurethane oligomer with a diol, wherein the polyurethane oligomer has a structure as shown in formula (2).

In one example of the second embodiment, m is 0 and the polyurethane oligomer is formed by reacting a bisphenol compound with a diisocyanate, and x is an integer of 5-100. Preferably, the bisphenol compound is bisphenol A.

In one example of the second embodiment, $R_1$ is derived from an aliphatic diamine, an aromatic diamine or a polyether diamine and $R_2$ is derived from an aromatic diisocyanate or an aliphatic diisocyanate; and the diol is selected from one of group consisting of a aliphatic diol, a polyether diol, a polyester diol and bisphenol. A weight ratio of the diol and the polyurethane oligomer is 1-3, m is an integer of 0-5, and x is an integer of 5-100.

In one example of the second embodiment, $R_1$ is derived from an amino compound containing siloxane groups and $R_2$ is derived from aliphatic diisocyanate; and the diol is selected from one of group consisting of an aliphatic diol and bisphenol. A weight ratio of the diol and the polyurethane oligomer is 0.2-0.8, m is an integer of 0-5, and x is an integer of 5-100.

In one example of the second embodiment, the high stress thermal plastic polyurethane has a stress more than about 2.5 MPa. Preferably, the high stress thermal plastic polyurethane has a stress more than about 5.0 MPa. In particular, the high stress thermal plastic polyurethane containing siloxane or polysiloxane groups has a stress more than about 15.0 MPa.

In one example of the second embodiment, the high stress thermal plastic polyurethane has a weight-average molecular weight of 10,000-400,000 Da.

In one example of the second embodiment, the high stress thermal plastic polyurethane has peaks at about 1.35-1.65 ppm or 3.65-4.15 ppm in $^1$H-NMR spectrum.

In one example of the second embodiment, the polyurethane oligomer has a weight-average molecular weight between 4,000 and 40,000 Da.

In one example of the second embodiment, the aliphatic diamine comprises a C2-C40 linear chain aliphatic diamine or a C2-C40 branched chain aliphatic diamine. Preferably, the C2-C40 linear chain aliphatic diamine is 1,4-butyl diamine, 1,5-pentyl diamine or 1,6-hexyl diamine.

In one example of the second embodiment, the aromatic diisocyanate comprises 4,4'-methylene diphenyl diisocyanate (MDI), 4,4'-difluoromethylene diphenyl diisocyanate, 1,4-phenylene diisocyanate, 1,3-phenylene diisocyanate, 1,2-phenylene diisocyanate, 2,2'-biphenyl diisocyanate, 3,3'-biphenyl diisocyanate, 4,4'-biphenyl diisocyanate, 1,5-naphthalene diisocyanate or their combination.

In one example of the second embodiment, the aliphatic diisocyanate comprises hexamethylene diisocyanate, isophorone diisocyanate (IPDI), 4,4'-dicyclohexylmethane diisocyanate or their combination.

In one example of the second embodiment, the aliphatic diol comprises a C2-C40 linear chain aliphatic diol or a C2-C40 branched chain aliphatic diol. Preferably, the C2-C40 linear chain aliphatic diol is 1,4-butyl diol, 1,5-pentyl diol or 1,6-hexyl diol.

In one example of the second embodiment, the polyether diol is selected from one of the group consisting of polytetramethylene ether glycol, polytetramethylene ether glycol-ethylene glycol copolymer, polytetramethylene ether glycol-propylene glycol copolymer and their combination.

In one example of the second embodiment, the polyester diol comprises polycarbonate diol, polycaprolactone diol (PCL) or their combination.

In one example of the second embodiment, the polyether diamine has a weight-average molecular weight between 100 and 5,000 Da. Preferably, the polyether amine is Jeffamine type polyether diamine.

In one example of the second embodiment, the amino compound containing siloxane or polysiloxane groups has a molecular weight between 150 and 10,000 Da.

The amino compound containing siloxane or polysiloxane groups has structure as shown in formula (3).

(3)

In a third embodiment, the invention provides a process for preparing thermal plastic polyurethane with high stress. The process comprises: (1) provide the formulation according to the first embodiment; and (2) perform a chain extension reaction to have the formulation according to the first embodiment form thermal plastic polyurethane with high stress, wherein the thermal plastic polyurethane with high stress has a stress more than about 2.5 MPa.

In one example of the third embodiment, the chain extension reaction is performed between 60 and 100° C.

In one example of the third embodiment, the thermal plastic polyurethane with high stress has peaks at about 1.35-1.65 ppm or 3.65-4.15 ppm in $^1$H-NMR spectrum.

In one example of the third embodiment, the thermal plastic polyurethane with high stress has a weight-average molecular weight of 10,000-400,000 Da In one representative example of the third embodiment, the PU oligomer that is prepared from MDI and the polycarbonate derivative, and PTMEG or PCL are used to produce the thermal plastic polyurethane with high stress and its structure is shown in formula (4). Where $R_1$ is derived from 1,6-hexyl diamine (HDA), $R_2$ is derived from MDI and $R_3$ is derived from PTMEG or PCL. Where m is an integer of 0-5, x is 5-500 and y is 1-40.

(4)

Working examples of the invention are described as following paragraphs.

Example 1: General Procedure for Preparing the Polycarbonate Derivative

Provides a mixture contain a solvent, polycarbonate (PC) and a diamine. The diamine may have siloxane or polysiloxane groups. The mixture may further contain diphenyl carbonate. The solvent comprises diethyl ether, di-n-propyl ether, isopropyl ether, anisole, ethoxybenzene, propoxybenzene, butoxybenzene, 2-methoxytoluene, 3-methoxytoluene, 4-methoxytoluene, benzyl ethyl ether, diphenyl ether, dibenzyl ether, tetrahydrofuran, 2,3-dihydropyran, tetrahydropyran, 2-methyl tetrahydropyran, benzene, toluene, xylene, ethylbenzene, diethylbenzene or cyclohexylbenzene. Heat the aforementioned mixture to 50-200° C. for preparing the crude polycarbonate derivative. After remove the solvent under vacuum distillation and then purify the crude polycarbonate derivative by column chromatography. Finally, the polycarbonate derivative is obtained. Some representative diamines and the final obtaining polycarbonate derivatives are shown in TABLE 1.

TABLE 1

| Exp No. | PC/gram | Diamine(Ew: g/eq)/gram | Polycarbonate derivative |
|---|---|---|---|
| 1 | 3 | 1,6-hexyl diamine(Ew = 58.1)/0.69 | Polycarbonate derivative A |
| 2 | 3 | Jeffamine EDR-148(Ew = 74.1)/0.87 | Polycarbonate derivative E |
| 3 | 3 | Diamine containing siloxane groups (Ew = 800)/9.63 | Polycarbonate derivative S |

Example 2: General Procedure for Synthesizing the PU Oligomer

The polyurethane oligomer is synthesized by polycondensation of the diisocyanates and the polycarbonate derivative prepared according to TABLE 1. The diisocyanates comprise MDI, IPDI or HDI. The polycondensation is performed at 60-100° C. Solvents including DMF, NMP, THF, DMSO or anisole are added for increasing the reaction rate. After the polycondensation is finished, a characteristic peak of carbamate group at 1750±50 cm$^{-1}$ is observed in the FTIR spectrum. The kind and usage of the diisocyanates and the polycarbonate derivative are shown in TABLE 2.

TABLE 2

| Exp No. | Polycarbonate derivative/gram | diisocyanate/gram | Symbol of the PU oligomer |
|---|---|---|---|
| 1 | Polycarbonate derivative A/3.69 | MDI/14.76 | AM-15 |
| 2 | Polycarbonate derivative A/3.69 | MDI/3.78 | AM-30 |
| 3 | Polycarbonate derivative A/3.69 | MDI/2.53 | AM-45 |
| 4 | Polycarbonate derivative A/3.69 | MDI/2.04 | AM-60 |
| 5 | Polycarbonate derivative E/3.87 | MDI/15.24 | EM-15 |
| 6 | Polycarbonate derivative E/3.87 | MDI/3.87 | EM-30 |
| 7 | Polycarbonate derivative E/3.87 | MDI/2.56 | EM-45 |
| 8 | Polycarbonate derivative E/3.87 | MDI/2.06 | EM-60 |
| 9 | Polycarbonate derivative S/12.63 | IPDI/4.36 | SI-30 |
| 10 | Polycarbonate derivative S/12.63 | IPDI/9.51 | SI-50 |
| 11 | Polycarbonate derivative S/12.63 | IPDI/21.52 | SI-70 |
| 12 | Polycarbonate derivative S/12.63 | MDI/4.36 | SM-30 |
| 13 | Polycarbonate derivative S/12.63 | MDI/9.51 | SM-50 |
| 14 | Polycarbonate derivative S/12.63 | MDI/21.52 | SM-70 |

The PU oligomers list in TABLE 2 has peaks at about 1.35-1.65 ppm or 3.65-4.15 ppm in $^1$H-NMR spectrum. Carbamate functional groups characterized peaks at about 7.5-8.0 ppm in $^1$H-NMR spectrum are also observed.

Example 3 General Procedure for Preparing the TPU

The PU oligomers list in TABLE 2 and diols are heat to 60-100° C. for obtaining various TPU by chain extension reaction. The kinds of the PU oligomers and weights of the diols are shown in TABLE 3.

TABLE 3

| Exp No. | PU oligomer | Diol/gram | Weight ratio of the Diol/PU oligomer | Symbol of the TPU |
|---|---|---|---|---|
| Control | X | X | — | EM-100 |
| 1 | AM-15 | PTMEG2000*/100.53 | 5.45 | AM-G15 |
| 2 | AM-30 | PTMEG2000/17.01 | 2.28 | AM-G30 |
| 3 | AM-45 | PTMEG2000/7.45 | 1.20 | AM-G45 |
| 4 | AM-60 | PTMEG2000/3.75 | 0.66 | AM-G60 |
| 5 | EM-15 | PTMEG2000/104.20 | 5.45 | EM-G15 |
| 6 | EM-30 | PTMEG2000/17.63 | 2.28 | EM-G30 |
| 7 | EM-45 | PTMEG2000/7.72 | 1.20 | EM-G45 |
| 8 | EM-60 | PTMEG2000/3.89 | 0.66 | EM-G60 |
| 9 | EM-15 | PCL2000**/104.20 | 5.45 | EM-L15 |
| 10 | EM-30 | PCL2000/17.63 | 2.28 | EM-L30 |
| 11 | EM-45 | PCL2000/7.72 | 1.20 | EM-L45 |
| 12 | EM-60 | PCL2000/3.89 | 0.66 | EM-L60 |
| 13 | EM-30 | PEG/17.63 | 2.28 | EM-E30 |
| 14 | EM-45 | PEG/7.72 | 1.20 | EM-E45 |
| 15 | EM-30 | PPG/17.63 | 2.28 | EM-P30 |
| 16 | EM-45 | PPG/7.72 | 1.20 | EM-P45 |
| 17 | SI-30 | 1,6-hexyl diol/1.26 | 0.07 | SI-O30 |
| 18 | SI-50 | 1,6-hexyl diol/3.57 | 0.16 | SI-O50 |
| 19 | SI-70 | 1,6-hexyl diol/8.97 | 0.26 | SI-O70 |
| 20 | SM-30 | 1,6-hexyl diol/l.26 | 0.07 | SM-O30 |
| 21 | SM-50 | 1,6-hexyl diol/3.57 | 0.16 | SM-O50 |
| 22 | SM-70 | 1,6-hexyl diol/8.97 | 0.26 | SM-O70 |

*PTMEG2000: Mw of PTMEG is 2,000 Da;
**PCL2000: Mw of PCL is 2,000 Da

The properties of the TPU list in TABLE 3 are shown in TABLE 4.

TABLE 4

| Exp No | TPU | Stress $^a$(MPa) | Strain$^b$(%) | Film formality $^c$ | PC$^d$(wt. %) | Tg$^e$(° C.) |
|---|---|---|---|---|---|---|
| Control | EM-100 | n.a. | n.a. | Brittle | 59.2 | 4 |
| 1 | AM-G15 | 0.7 | 118 | Poor | 2.5 | n.a. |
| 2 | AM-G30 | 2.7 | 1090 | Good | 12.2 | n.a. |
| 3 | AM-G45 | 9.0 | 650 | Good | 22.0 | n.a. |
| 4 | AM-G60 | 1.7 | 127 | Poor | 31.6 | n.a. |
| 5 | EM-G15 | 0.6 | 226 | Poor | 2.43 | n.a. |
| 6 | EM-G30 | 13.2 | 1205 | Good | 11.8 | n.a |
| 7 | EM-G45 | 15.2 | 996 | Good | 21.2 | −59 |
| 8 | EM-G60 | 3.7 | 603 | Poor | 30.5 | −52 |
| 9 | EM-L15 | 2.8 | 5 | Poor | 2.43 | n.a |
| 10 | EM-L30 | 2.9 | 45 | Good | 11.8 | −39 |
| 11 | EM-L45 | 4.3 | 555 | Good | 21.2 | −31 |
| 12 | EM-L60 | 3.1 | 229 | Poor | 30.5 | −20 |
| 13 | EM-E30 | n.a. | n.a. | fragile | 11.8 | n.a |
| 14 | EM-E45 | n.a. | n.a. | fragile | 21.2 | n.a |
| 15 | EM-P30 | n.a. | n.a. | fragile | 11.8 | n.a |
| 16 | EM-P45 | n.a. | n.a. | fragile | 21.2 | n.a |
| 17 | SI-O30 | n.a. | n.a. | fragile | 16.4 | 3.8 |
| 18 | SI-O50 | n.a. | n.a. | fragile | 11.7 | 3.1 |
| 19 | SI-O70 | 54 | 11 | Good | 7.0 | 3.3 |

TABLE 4-continued

| Exp No | TPU | Stress $^a$(MPa) | Strain$^b$(%) | Film formality $^c$ | PC$^d$(wt. %) | Tg$^e$(° C.) |
|---|---|---|---|---|---|---|
| 20 | SM-O30 | n.a. | n.a. | fragile | 16.4 | n.a |
| 21 | SM-O50 | n.a. | n.a. | fragile | 11.7 | n.a |
| 22 | SM-O70 | n.a. | n.a. | fragile | 7.0 | 3.8 |

$^a$Stress(MPa) measured by tensile testing machine;
$^b$Strain(%) measured by tensile testing machine;
$^c$ Visual observation;
$^d$theoretic polycarbonate content in the TPU (grams of the polycarbonate/grams of the TPU);
$^e$Glass transition temperature measured by DSC;
n.a.: Not available.

According to the TABLE 4, AM-G30, AM-G45, EM-G30, EM-G45, EM-L30, EM-L45 and SI-O70 has stress more than 2.5 MPa and good film formality.

On the other hand, TPU formed from PEG or PPG, herein refer to EM-E30, EM-E45, EM-P30 and EM-P45, are not able to measure the stress and strain due to their fragile film. As a result, the invented formulation for preparing the TPU with high stress excludes PEG and PPG diols.

Furthermore, the TPU formed by the PU oligomers containing both siloxane or polysiloxane groups and aromatic groups, such as SM-30, SM-50, and SM-70; and 1,6-hexyl diol are not able to measure the stress and strain due to their fragile film.

DSC analysis of EM-G30, SI-O70, EM-E45 and EM-P45 are shown in FIG. 3, FIG. 4, FIG. 5 and FIG. 6, respectively. EM-E45 and EM-P45 has an exothermic peak at −33° C. and −20° C. Furthermore, EM-E45 and EM-P45 are not able to measure their stress and strain due to their fragile structure at room temperature.

Stress Measurement of the TPU

Figure 1:
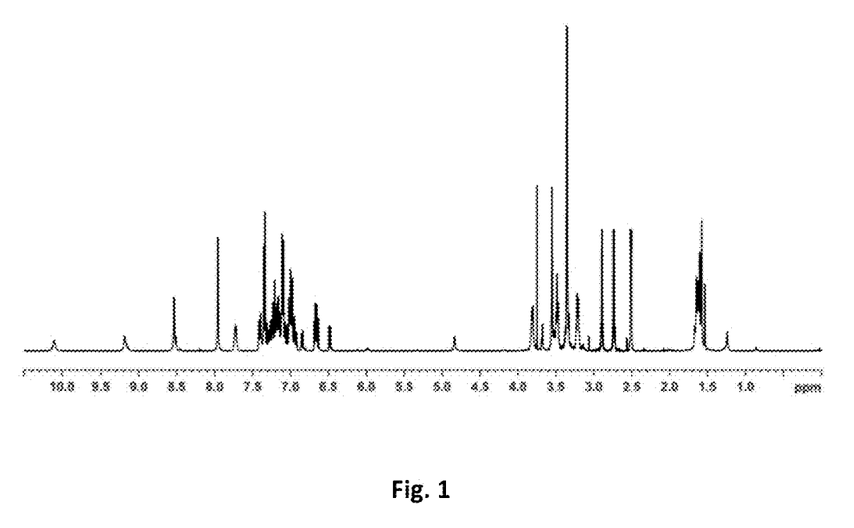
FIG. 1 is a $^1$H-NMR spectrum of the PU oligomer described in the first embodiment.
Figure 2:
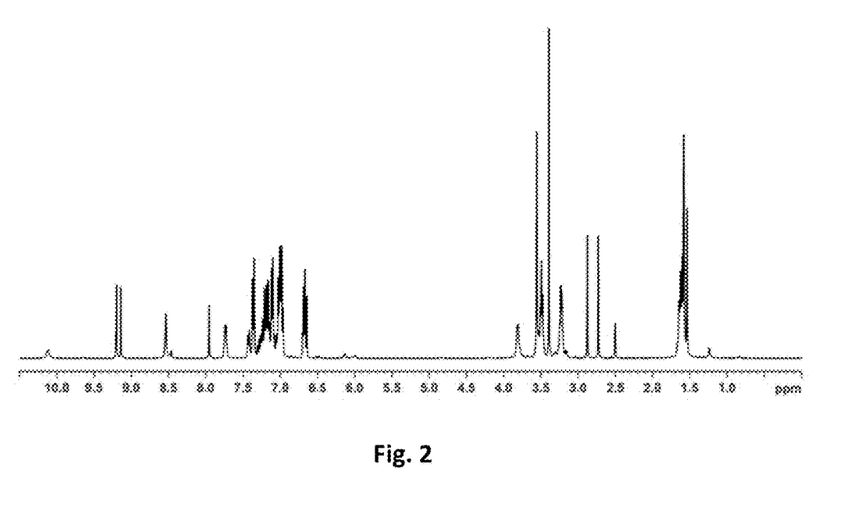
FIG. 2 is a $^1$H-NMR spectrum of the TPU described in the second embodiment.
Figure 3:
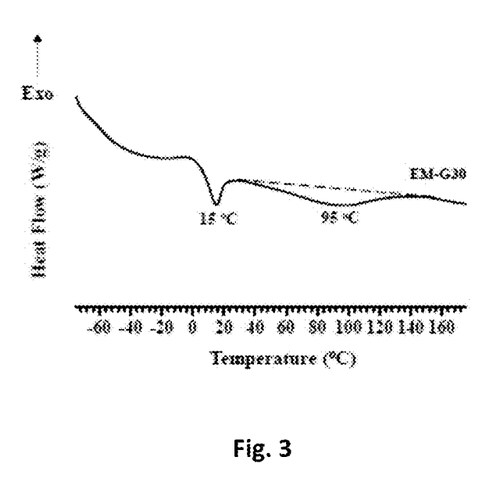
FIG. 3 is a DSC spectrum directed to the TPU EM-G30.
Figure 4:
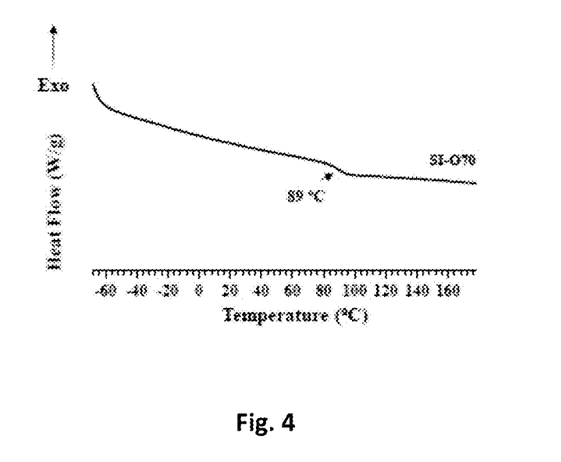
FIG. 4 is a DSC spectrum directed to the TPU SI-O70.
Figure 5:
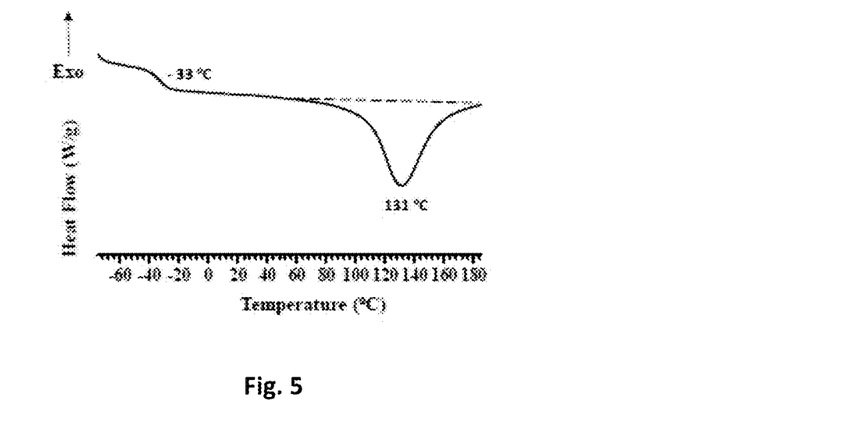
FIG. 5 is a DSC spectrum directed to the TPU EM-E45.
Figure 6:
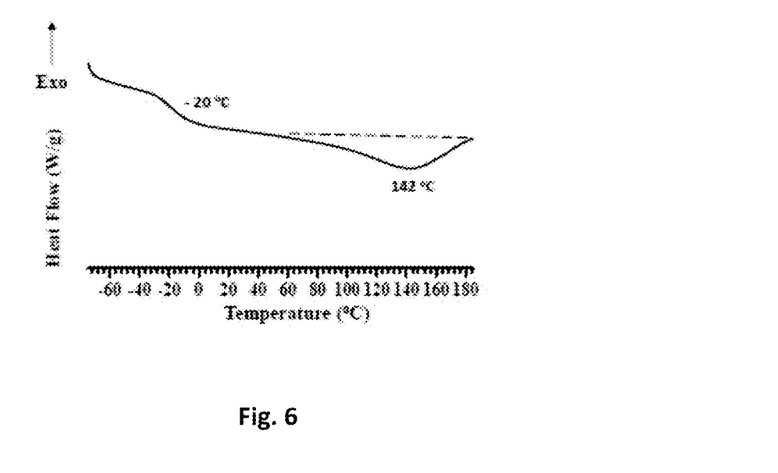
FIG. 6 is a DSC spectrum directed to the TPU EM-P45.
Figure 7:
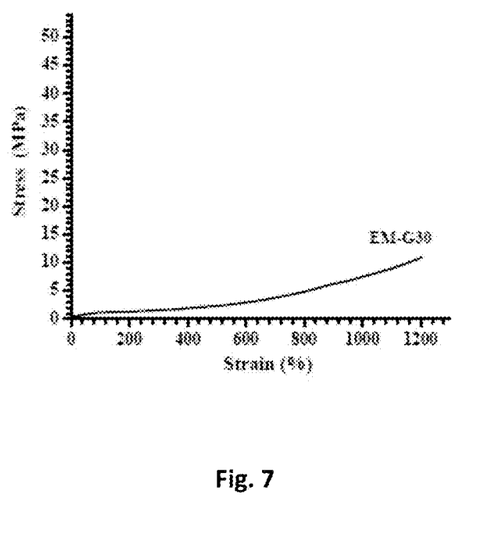
FIG. 7 is a plot of stress and strain of the TPU EM G-30.
Figure 8:
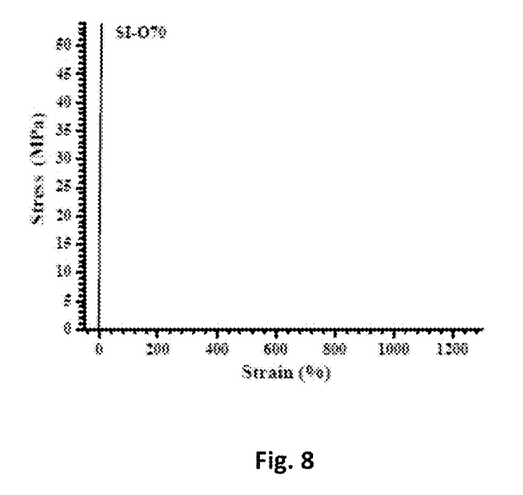
FIG. 8 is a plot of stress and strain of the TPU SI-O70.

Stress and strain of EM-G30, SI-O70, EM-E45 and EM-P45 are measured by tensile testing machine (MTS Landmark 370.02 Test System). The testing method is according to ASTM D638. The tensile rate is 100 mm/min. EM-G30 has a stress about 13.0 MPa. SI-O70 has a stress about 54 MPa. However, EM-E45 and EM-P45 are broken or fragile during the testing. Therefore, PEG and PPG diols are not good chain extenders for using in the present invented formulation.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A formulation for preparing thermal plastic polyurethane with a stress more than 2.5 MPa, comprising a polyurethane oligomer and a chain extender; wherein the polyurethane oligomer is formed by reacting a polycarbonate derivative having a structure as shown in formula (1) with a diisocyanate, (1)

-continued wherein the polycarbonate derivative with R$_1$ is derived from a polyether diamine having a weight-average molecular weight between 100 and 5,000 Da, and m is an integer of 1-5; the diisocyanate is an aromatic diisocyanate; and
wherein the chain extender is a polyether diol, and a weight ratio of the polyether diol to the polyurethane oligomer is 1-3; or
wherein the polycarbonate derivative with R$_1$ is derived from an amino compound containing siloxane groups, and m is an integer of 1-5; the diisocyanate is an aliphatic diisocyanate; and wherein the chain extender is an aliphatic diol, and a weight ratio of the aliphatic diol to the polyurethane oligomer is 0.2-0.8.

2. The formulation for preparing thermal plastic polyurethane with a stress more than 2.5 MPa of claim 1, wherein the polyether diamine having a weight-average molecular weight between 100 and 5,000 Da is triethyleneglycol diamine (m.w. 148.2 g/mol).

3. The formulation for preparing thermal plastic polyurethane with a stress more than 2.5 MPa of claim 1, wherein the aromatic diisocyanate is 4,4'-methylene diphenyl diisocyanate, 4,4'-difluoromethylene diphenyl diisocyanate, 1,4-phenylene diisocyanate, 1,3-phenylene diisocyanate, 1,2-phenylene diisocyanate, 2,2'-biphenyl diisocyanate, 3,3'-biphenyl diisocyanate, 4,4'-biphenyl diisocyanate, 1,5-naphthalene diisocyanate or their combination.

4. The formulation for preparing thermal plastic polyurethane with a stress more than 2.5 MPa of claim 1, wherein the polyether diol is polytetramethylene ether glycol.

5. The formulation for preparing thermal plastic polyurethane with a stress more than 2.5 MPa of claim 1, wherein the amino compound containing siloxane groups has a molecular weight between 150 and 10,000 Da.

6. The formulation for preparing thermal plastic polyurethane with a stress more than 2.5 MPa of claim 1, wherein the aliphatic diisocyanate is hexamethylene diisocyanate, isophorone diisocyanate or 4,4'-dicyclohexylmethane diisocyanate.

7. The formulation for preparing thermal plastic polyurethane with a stress more than 2.5 MPa of claim 1, wherein the aliphatic diol is a C2-C40 linear chain aliphatic diol or a C2-C40 branched chain aliphatic diol.

8. A thermal plastic polyurethane with a stress more than 2.5 MPa, being formed by reacting a polyurethane oligomer with a diol, wherein the polyurethane oligomer has a structure as shown in formula (2):

where R₁ is derived from a polyether diamine having a weight-average molecular weight between 100 and 5,000 Da, R₂ is derived from an aromatic diisocyanate, m is an integer of 1-5, and x is an integer of 5-100; wherein the diol is a polyether diol, and a weight ratio of the polyether diol to the polyurethane oligomer is 1-3; or where R₁ is derived from an amino compound containing siloxane groups, R₂ is derived from a aliphatic diisocyanate, m is an integer of 1-5, and x is an integer of 5-100; wherein the diol is a aliphatic diol, and a weight ratio of the aliphatic diol to the polyurethane oligomer is 0.2-0.8.

9. The thermal plastic polyurethane with a stress more than 2.5 MPa of claim 8, wherein the polyether diamine having a weight-average molecular weight between 100 and 5,000 Da is triethyleneglycol diamine (m.w. 148.2 g/mol).

10. The thermal plastic polyurethane with a stress more than 2.5 MPa of claim 8, wherein the aromatic diisocyanate is 4,4'-methylene diphenyl diisocyanate, 4,4'-difluoromethylene diphenyl diisocyanate, 1,4-phenylene diisocyanate, 1,3-phenylene diisocyanate, 1,2-phenylene diisocyanate, 2,2'-biphenyl diisocyanate, 3,3'-biphenyl diisocyanate, 4,4'-biphenyl diisocyanate, 1,5-naphthalene diisocyanate or their combination.

11. The thermal plastic polyurethane with a stress more than 2.5 MPa of claim 8, wherein the polyether diol is polytetramethylene ether glycol.

12. The thermal plastic polyurethane with a stress more than 2.5 MPa of claim 8, wherein the amino compound containing siloxane groups has a molecular weight between 150 and 10,000 Da.

13. The thermal plastic polyurethane with a stress more than 2.5 MPa of claim 8, wherein the aliphatic diisocyanate is hexamethylene diisocyanate, isophorone diisocyanate or 4,4'-dicyclohexylmethane diisocyanate.

14. The thermal plastic polyurethane with a stress more than 2.5 MPa of claim 8, wherein the aliphatic diol is a C2-C40 linear chain aliphatic diol or a C2-C40 branched chain aliphatic diol.

15. The thermal plastic polyurethane with a stress more than 2.5 MPa of claim 8, having a weight-average molecular weight of 10,000-400,000 Da.

16. The thermal plastic polyurethane with a stress more than 2.5 MPa of claim 8, wherein the polyurethane oligomer has a weight-average molecular weight between 4,000 and 40,000 Da.

17. A process for making thermal plastic polyurethane with a stress more than 2.5 MPa, comprising a step of performing a chain extension reaction to obtain the thermal plastic polyurethane with a stress more than 2.5 MPa from the formulation of claim 1.

18. The process for making thermal plastic polyurethane with a stress more than 2.5 MPa of claim 17, wherein the chain extension reaction is performed at a temperature between 60 and 100° C.

19. The process for making thermal plastic polyurethane with a stress more than 2.5 MPa of claim 17, wherein the thermal plastic polyurethane with a stress more than 2.5 MPa has peaks at about 1.35-1.65 ppm or 3.65-4.15 ppm in ¹H-NMR spectrum.

20. The process for making thermal plastic polyurethane with a stress more than 2.5 MPa of claim 17, wherein the thermal plastic polyurethane with a stress more than 2.5 MPa has a weight-average molecular weight of 10,000-400,000 Da.

* * * * *